United States Patent
Zha et al.

(10) Patent No.: US 11,683,509 B1
(45) Date of Patent: Jun. 20, 2023

(54) PREDICTION UNIT SKIP DETECTION IN ENCODER

(71) Applicant: Meta Platforms, Inc., Menlo Park, CA (US)

(72) Inventors: Xianliang Zha, El Dorado Hills, CA (US); Yunqing Chen, Los Altos, CA (US); Shiyan Pan, San Jose, CA (US); Harikrishna Madadi Reddy, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/513,770

(22) Filed: Oct. 28, 2021

(51) Int. Cl.
*H04N 7/12* (2006.01)
*H04N 19/423* (2014.01)
*H04N 19/172* (2014.01)
*H04N 19/169* (2014.01)
*H04N 19/18* (2014.01)

(52) U.S. Cl.
CPC ......... *H04N 19/423* (2014.11); *H04N 19/172* (2014.11); *H04N 19/18* (2014.11); *H04N 19/188* (2014.11)

(58) Field of Classification Search
CPC .... H04N 19/423; H04N 19/172; H04N 19/18; H04N 19/188
USPC ..................................... 375/240.26
See application file for complete search history.

(56) References Cited

U.S. PATENT DOCUMENTS

| | | | |
|---|---|---|---|
| 7,200,275 B2 | 4/2007 | Srinivasan et al. | |
| 7,295,613 B2 | 11/2007 | Bjontegaard | |
| 8,121,194 B2 | 2/2012 | Shima | |
| 8,379,728 B2 | 2/2013 | Katzur et al. | |
| 9,350,996 B2 * | 5/2016 | Fang | H04N 19/132 |
| 10,469,863 B2 * | 11/2019 | Zhu | H04N 19/91 |
| 2015/0092855 A1 * | 4/2015 | Chou | H04N 19/147 375/240.16 |
| 2017/0026645 A1 * | 1/2017 | Zhou | H04N 19/176 |
| 2017/0214912 A1 * | 7/2017 | Cote | H04N 19/147 |
| 2022/0030280 A1 * | 1/2022 | Zhu | H04N 19/96 |

OTHER PUBLICATIONS

Pradhan A.K., et al., "FPGA based High Performance CAVLC Implementation for H.264 Video Coding," International Journal of Computer Applications (0975-8887), May 2013, vol. 69, No. 10, pp. 23-28.

* cited by examiner

*Primary Examiner* — Gims S Philippe
(74) *Attorney, Agent, or Firm* — Van Pelt, Yi & James LLP

(57) ABSTRACT

Techniques for detecting skipped prediction units in an encoder are disclosed. Control information associated with a prediction unit of a video frame is received at a node of a video encoding pipeline used to compress the video frame. A skip decision for the prediction unit is made by analyzing transform units comprising the prediction unit. The skip decision indicates whether or not the prediction unit comprises a skipped prediction unit during encoding. The skip decision for the prediction unit is provided to a downstream node of the video encoding pipeline.

20 Claims, 4 Drawing Sheets

PREDICTION UNIT SKIP DETECTION IN ENCODER

BACKGROUND

Existing techniques used to detect skipped blocks during encoding are not efficient even though skipped blocks are an important feature in codec standards. That is, some blocks that should be skipped may not be identified as skipped blocks on the fly due to performance and cost constraints. Thus, there exists a need for improved techniques with low cost to detect skipped blocks during encoding.

BRIEF DESCRIPTION OF THE DRAWINGS

Various embodiments of the disclosure are disclosed in the following detailed description and the accompanying drawings.

DETAILED DESCRIPTION

Figure 1A:
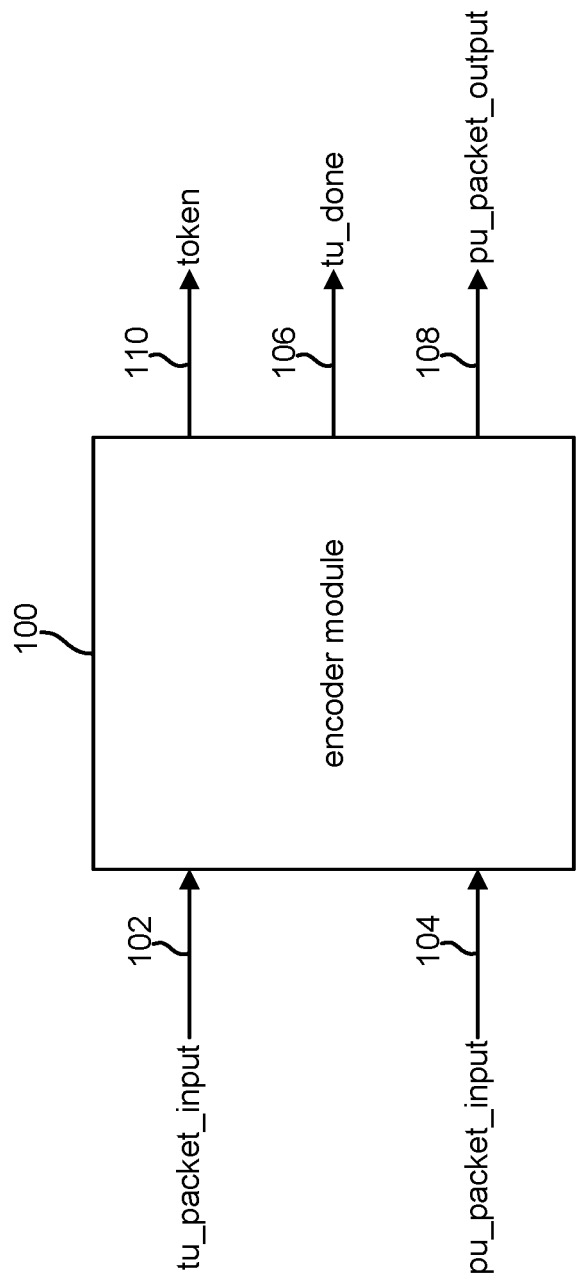
FIG. 1A is a high level block diagram illustrating an embodiment of inputs into and outputs from an encoder module.

The disclosure can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the disclosure may take, may be referred to as techniques. In general, the order of the steps of disclosed processes may be altered within the scope of the disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims, and the disclosure encompasses numerous alternatives, modifications, and equivalents. Numerous specific details are set forth in the following description in order to provide a thorough understanding of the disclosure. These details are provided for the purpose of example, and the disclosure may be practiced according to the claims without some or all of these specific details. For the purpose of clarity, technical material that is known in the technical fields related to the disclosure has not been described in detail so that the disclosure is not unnecessarily obscured.

The disclosure includes a method comprising receiving control information associated with a prediction unit of a video frame at a node of a video encoding pipeline used to compress the video frame, making a skip decision for the prediction unit by analyzing transform units comprising the prediction unit, wherein the skip decision indicates whether the prediction unit is skipped during encoding, and providing the skip decision for the prediction unit to a downstream node of the video encoding pipeline. Moreover, the disclosure includes a node of a video encoding pipeline used to compress a video frame comprising a buffer memory configured to store received control information associated with a prediction unit of the video frame and a processor coupled to the buffer memory and configured to make a skip decision for the prediction unit by analyzing transform units comprising the prediction unit, wherein the skip decision indicates whether the prediction unit is skipped during encoding and provide the skip decision for the prediction unit to a downstream node of the video encoding pipeline. Furthermore, the disclosure includes a computer program product embodied in a non-transitory computer readable medium and comprising computer instructions for receiving control information associated with a prediction unit of a video frame at a node of a video encoding pipeline used to compress the video frame, making a skip decision for the prediction unit by analyzing transform units comprising the prediction unit, wherein the skip decision indicates whether the prediction unit is skipped during encoding, and providing the skip decision for the prediction unit to a downstream node of the video encoding pipeline.

A codec generally comprises hardware and software components for encoding (compressing) and decoding (decompressing) data signals, such as multimedia content, that in their raw format consume substantial bandwidth. Compression facilitates more efficient storage and transmission of such content but typically at the expense of some loss of information.

A video codec is specifically employed to more efficiently store and deliver video content and comprises encoding and decoding video data according to a prescribed video coding format or standard. More specifically, encoding comprises processing stages associated with compressing video data, and decoding comprises processing stages associated with inverting the compression to the extent possible. Video content is typically processed frame by frame. Moreover, each frame is typically divided into a plurality of blocks of pixels that are processed in a prescribed order, such as a raster scan order, i.e., from left to right and from top to bottom of the frame.

A frame may generally be partitioned and processed in any appropriate manner. For example, a frame may be divided into a plurality of (raster ordered) super blocks. A super block (SB) may be divided into one or more coding units that partition the super block into arbitrary rectangular regions. For example, a super block may be recursively partitioned into one or more square coding units. A coding unit (CU) may be divided into one or more prediction units of possibly different block sizes. A prediction unit (PU) comprises the basic or elementary processing unit for intra-prediction and inter-prediction and stores prediction data such as intra-prediction angle or inter-prediction motion vector. A prediction unit comprises luma and chroma (e.g., YUV, YCbCr) components. A prediction unit may be divided into a plurality of transform units. A transform unit (TU) comprises the basic or elementary processing unit for transform and quantization and stores transform data, i.e., coefficient values. In some embodiments, a frame is partitioned into hierarchical levels of processing blocks or units according to a prescribed codec format such as VP9.

A transform unit (TU) comprises a matrix of coefficients. In some cases, the matrix of coefficients comprises a sparse matrix that is populated with mostly or all zero values. Coefficients skip, i.e., skipping zero coefficients in various codec processing stages, is an important feature in modern codecs to conserve storage and processing resources as well as to achieve better compression rates. Various techniques associated with making a skip decision in an encoder are disclosed herein. Generally, a skipped block during encoding comprises a block for which no information is sent to a decoder, i.e., no coded coefficients, no prediction information, no headers, etc. A block skip mode generally implies the use of a zero motion vector and no coded residual. A decoder estimates a motion vector for a skipped block from neighboring coded blocks and uses this to calculate a motion compensated prediction for the skipped block. Moreover, in some cases, neighboring coded block information (e.g., skip or not) is employed to derive context information for a current block being decoded. In general, a skipped block refers to a block with a zero motion vector and coefficients skipped while a block with all zero coefficients is referred to as coefficients skip . In the present disclosure, the terms 'skip' and 'skip block' as well as variations thereof specifically refer to coefficients skip, i.e., all coefficients are zero, i.e., no coded residual.

FIG. 1A is a high level block diagram illustrating an embodiment of inputs into and outputs from an encoder module 100. In some embodiments, encoder module 100 follows a transform and quantization stage in an encoder pipeline and precedes a probability determination stage in the encoder pipeline. In some embodiments, encoder module 100 facilitates management of a coefficient token buffer memory that is a part of a statistical analysis stage of the encoder pipeline that is used to generate symbol statistics. Encoder module 100 may generally comprise any combination of one or more appropriate components such as processing units, control logic, buffer memories, etc.

In some embodiments, encoder module 100 is configured to check a predicted or prior skip decision that was previously made at an upstream node or module in the encoder pipeline to determine whether or not the prior skip decision is accurate, update the prior skip decision if the prior skip decision is not accurate, and/or make an accurate actual or real skip decision that is output to a downstream node or module in the encoder pipeline. The skip decision made by encoder module 100 is associated with a prescribed prediction unit (PU). A PU is defined as a skipped PU if all of its luminance and chrominance (e.g., YUV, YCbCr, etc.) components have all zero coefficients.

Encoder module 100 comprises two input packets, i.e., TU packet 102 and PU packet 104. Input packets 102 and 104 that are input into encoder module 100 are output by an upstream node or module in an associated encoding pipeline. In some embodiments, TU packets are serially input into and processed by encoder module 100 in a prescribed order for a given PU until processing for that PU is complete. For example, the prescribed order may comprise TU packets associated with a Y component of a PU followed by TU packets associated with a U (Cb) component of the PU followed by TU packets associated a V (Cr) component of the PU. In general, TU packet 102 arrives after a corresponding PU packet 104, which includes TU control information such as TU size for TU skip detection. In the cases in which TU packet 102 arrives before corresponding PU packet 104, a TU packet process waits until the corresponding PU packet arrives.

TU packet 102 that is input into encoder module 100 comprises a sequence of (coefficient, coefficient index) pairs specified in, for example, raster order. The coefficient index is incremented from left to right and from top to bottom with respect to a matrix of coefficients and indicates a raster order position of each coefficient in the matrix. As one example, consider a 4×4 TU matrix comprising the following coefficient values specified in raster order: 45, 0, 15, 0, 20, 10, 0, 0, 5, 0, 0, 0, 1, 0, 0, 0. For the 4×4 TU matrix of this example, coefficient index values corresponding to coefficient positions in the matrix comprise values ranging from 0 to 15, respectively. Thus, input TU packet 102 in the given example comprises the following sequence of pairs: (45, 0), (0, 1), (15, 2), (0, 3), (20, 4), (10, 5), (0, 6), (0, 7), (5, 8), (0, 9), (0, 10), (0, 11), (1, 12), (0, 13), (0, 14), (0, 15). As further described in detail below, TU coefficient values may be converted within encoder module 100 into a more compact token format or representation for more efficient storage and processing and/or the order of TU coefficients or corresponding tokens may be modified within encoder module 100 according to an associated scan table such that the TU coefficient matrix has more tailing zeros that can be dropped, i.e., that do not have to be persisted for future processing.

PU packet 104 that is input into encoder module 100 comprises control information associated with a corresponding PU. For example, input PU packet 104 may comprise control information such as PU skip bit, PU location, PU size, TU depth, intra mode, inter bit, etc. The PU size and TU depth parameters may be employed to derive TU size and a corresponding scan table size. Moreover, the intra mode, inter bit, and other control parameters may be employed to select a scan table type.

In the example of FIG. 1A, encoder module 100 comprises three outputs. A TU done output 106 is used to indicate that processing of a current TU is complete. PU packet 108 that is output by encoder module 100 comprises input PU packet 104 but with the PU skip bit updated, if applicable, to reflect an actual or real PU skip decision that is made based on determining whether the TUs comprising the PU comprise all zero coefficient values or not. Non-zero coefficient token values stored in a buffer memory managed by encoder module 100 may be read as output 110 from encoder module 100, for example, so that they can be processed or analyzed to generate corresponding statistical data.

Figure 1B:
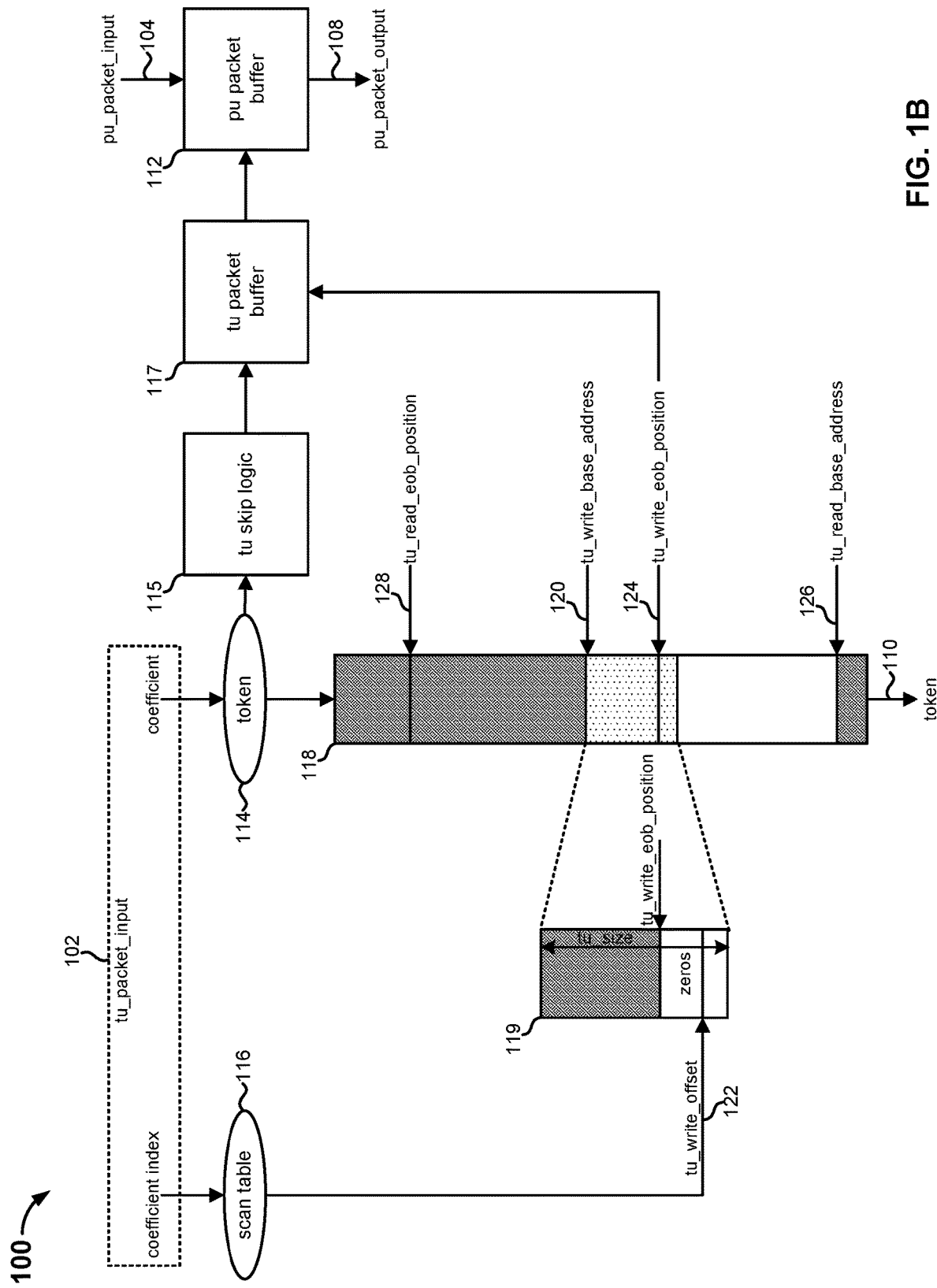
FIG. 1B is a high level block diagram illustrating components comprising an embodiment of an encoder module.

FIG. 1B is a high level block diagram illustrating components comprising an embodiment of encoder module 100. Components relevant for describing the functionality of encoder module 100 are illustrated in FIG. 1B for the purpose of example. However, in various embodiments, encoder module 100 may generally comprise any combination of a plurality of appropriate hardware and/or software components to realize the described functionality.

Input PU packet 104 is received from an upstream encoder module or node and written or stored in PU packet buffer 112 of encoder module 100. Input PU packet 104 comprises control information including a PU skip bit value. If the PU skip bit of input PU packet 104 has a value indicating that the PU is skipped, no further processing with respect to that PU is performed by encoder module 100, i.e., no associated TU packets are received as input into encoder module 100 since all corresponding TU coefficients have already been determined to be zero at a previous encoder stage. In this case, output PU packet 108 is the same as input PU packet 104 and is read from PU packet buffer 112 by a downstream encoder module or node for further encoding related processing. If the PU skip bit of input PU packet 104 has a value indicating that the PU is not skipped, it is determined whether the PU should really not be skipped. In this case, each of a plurality of TU packets 102 that is associated with the current PU is serially input into encoder module 100 in a prescribed order and checked to determine whether any non-zero coefficients exist so that a skip bit value of the current PU can be determined.

A TU packet 102 input into encoder module 100 is received from an upstream encoder module or node and comprises a sequence of (coefficient, coefficient index) pairs specified in, for example, raster order. Coefficient values of TU packet 102 comprise raw quantization values and thus, in many cases, have substantial bit depth. Such coefficient values may be converted into a more compact token format via token conversion module 114 so that storage and processing resources may be better conserved or optimized. As one example, 16 bit input coefficient values are converted into 4 bit token values via token conversion module 114. Thus, a token representation provides a substantial reduction in the amount of data that needs to be stored and/or processed.

TU packet 102 may moreover comprise a sparse matrix of coefficients having a substantial number of zero entries that do not need to be stored or persisted for future processing. In such cases, it may be desirable to modify the ordering of the matrix of coefficients from a raster order to a prescribed scan order specified by scan table 116. An input matrix of coefficients of TU packet 102 may be reorganized from a raster order to a prescribed scan order using any appropriate scan conversion that facilitates moving at least some zero entries of the matrix such that they are positioned as tailing zeros after the conversion. For instance, consider the aforementioned example of the 4×4 TU matrix comprising the following coefficient values in raster order: 45, 0, 15, 0, 20, 10, 0, 0, 5, 0, 0, 0, 1, 0, 0, 0. Furthermore, consider a corresponding 4×4 scan table comprising the following coefficient index values in raster order: 0, 4, 1, 5, 8, 2, 12, 9, 3, 6, 13, 10, 7, 14, 11, 15. The scan table does not specify coefficient index values in a linearly incremental manner and thus specifies a different ordering of coefficient values than the raster order. With the given scan table example, coefficient values are rearranged into a corresponding scan order in which the coefficient value at coefficient index 0 is first, the coefficient value at coefficient index 4 is second, the coefficient value at coefficient index 1 is third, the coefficient value at coefficient index 5 is fourth, the coefficient value at coefficient index 8 is fifth, and so forth. More specifically, the coefficient values are reorganized into the following scan order: 45, 20, 0, 10, 5, 15, 1 (EOB), 0, 0, 0, 0, 0, 0, 0, 0, 0. Thus, the scan order comprises more tailing zeros than the raster order. Tailing zeros do not need to be persisted for future processing. Thus, tailing zeros may be dropped or truncated without occupying storage, with an EOB (end-of-block) position corresponding to the last non-zero entry. In the given example, the raster order requires storage of thirteen coefficient values while the scan order requires storage of only seven coefficient values. Thus, arranging a matrix of coefficient values in a prescribed or selected scan order further provides a reduction in the amount of data that needs to be stored and/or processed. Different scan tables may be used for different TUs and/or PUs.

In the example of FIG. 1B, encoder module 100 processes each TU comprising a current PU for which a skip decision needs to be made. TUs comprising the current PU may be received and subsequently processed by encoder module 100 in a prescribed order. For example, TUs associated with a Y component of the current PU may be received first, followed by the U (Cb) component, and lastly the V (Cr) component. While processing an input TU packet 102, coefficient values are converted into token values by token conversion module 114. In some cases, all coefficient token values of input TU packet 102 are zero. In such cases, the current TU comprises a skipped TU that has no non-zero values. TU skip logic 115 determines whether a current input TU packet 102 comprises a skipped TU or a not skipped TU, i.e., checks whether all coefficient token values of the TU are zero. Once coefficient token values of the current TU have been checked, TU skip logic 115 updates a TU skip bit value that indicates whether the current TU is skipped or not. In general, as long as a first non-zero coefficient token in a TU is detected, the TU is declared as not skipped without checking all of the remaining coefficient tokens of the TU, effectively facilitating TU-skip early detection. A PU comprises multiple TUs, and as long as one TU of the PU is detected as not skipped, the PU is likewise declared as not skipped, effectively facilitating PU-skip early detection. The TU skip bit is written or stored in TU packet buffer 117, which comprises a small buffer memory for storing control information associated with a TU packet. Coefficient tokens of a TU that is not skipped are written in a scan order specified by scan table 116 into a buffer memory 118 configured to store coefficient token values for future processing. In some embodiments, buffer 118 comprises a circular buffer. In the illustration of FIG. 1B, occupied portions of buffer 118 that store data are illustrated with a dark fill, a current write area of buffer 118 is illustrated with a lighter fill, and empty areas of buffer 118 are illustrated with no fill. Write base address 120 indicates a current position within buffer 118 at which to commence writing new input data. An enlarged view of current write area 119 of buffer 118 is also illustrated in FIG. 1B. The location and size of current write area 119 within buffer 118 is defined by the current write base address and size of the current TU.

A coefficient token value of a current TU is written into buffer 118 at a position or address within current working area 119 that is determined by adding an offset 122 to base address 120. The offset from the base address corresponds to the offset of a corresponding coefficient index in scan table 116. Therefore, coefficient token values are serially written into current working area 119 of buffer 118 at corresponding offset positions specified by scan table 116 instead of serially being written in raster order. Such a scan order write of TU coefficient token values into buffer 118 results in a scan order arrangement of coefficient token values in buffer 118 that has an end portion comprising tailing zeros that do not need to be persisted in buffer 118 for future processing. Buffer space occupied by tailing zeros is released for future use during a next write. Thus, the amount of buffer space occupied by each TU is adapted based on the tailing zeros comprising that TU. For each TU written into buffer 118, a write EOB position or address 124 within buffer 118 is maintained and corresponds to a last (maximum scan index) non-zero token value written for that TU. TU write EOB position 124 is written or stored in TU packet buffer 117. If a TU skip bit value indicates that a current TU is a skipped TU, TU write base address 120 of buffer 118 is not updated since there is no write into buffer 118 for the current TU. If a TU skip bit value indicates that a current TU is not a skipped TU, TU write base address 120 of buffer 118 is updated to the current TU write EOB address +1 for the next TU write into buffer 118.

If all TUs comprising a current PU are determined to be skipped TUs, the current PU skip bit is updated to indicate a skipped PU. However, if any token of any TU of a current PU is not zero, the PU is not a skipped PU, and, in this case, the PU skip bit is not updated, although a write pointer of PU packet buffer 112 is updated since the PU skip bit value (not skipped) is determined when received with input PU packet 104. A write pointer of TU packet buffer 117 may be updated when a TU skip state (true or false) is decided. A first non-zero token value decides that a current TU is not skipped. This is referred to as a TU early skip decision. An EOB position in TU packet buffer 117 is valid when its value is not null, and the EOB position is updated when all coefficients of the current TU have been processed. Output PU packet 108 comprises the same control information as input PU packet 104 but with a possibly updated PU skip bit if the current PU is determined to be skipped. Once coefficient tokens comprising a TU have been written into buffer 118, they can be read from buffer 118 for future processing, such as for determining associated statistics. In the example of FIG. 1B, a TU read commences at TU read base address 126 and ends at TU read EOB position 128.

Various described design considerations facilitate use of a relatively small sized buffer 118 in an encoder module 100 that is employed to dynamically perform skip detection on the fly during encoding without performance degradation. Buffer size is optimized, i.e., the buffer size needed for buffer 118 is minimized or at least reduced to the extent possible, for example, by identifying and not writing skipped TUs, converting coefficient values into smaller sized token values, writing token values in scan order rather than raster order, tracking TU EOB positions so that buffer space comprising tailing zeros can be released during each TU write, etc. In one embodiment, for example, only two small 32×32 pixel buffers are needed for buffer 118 in encoder module 100.

Figure 2:
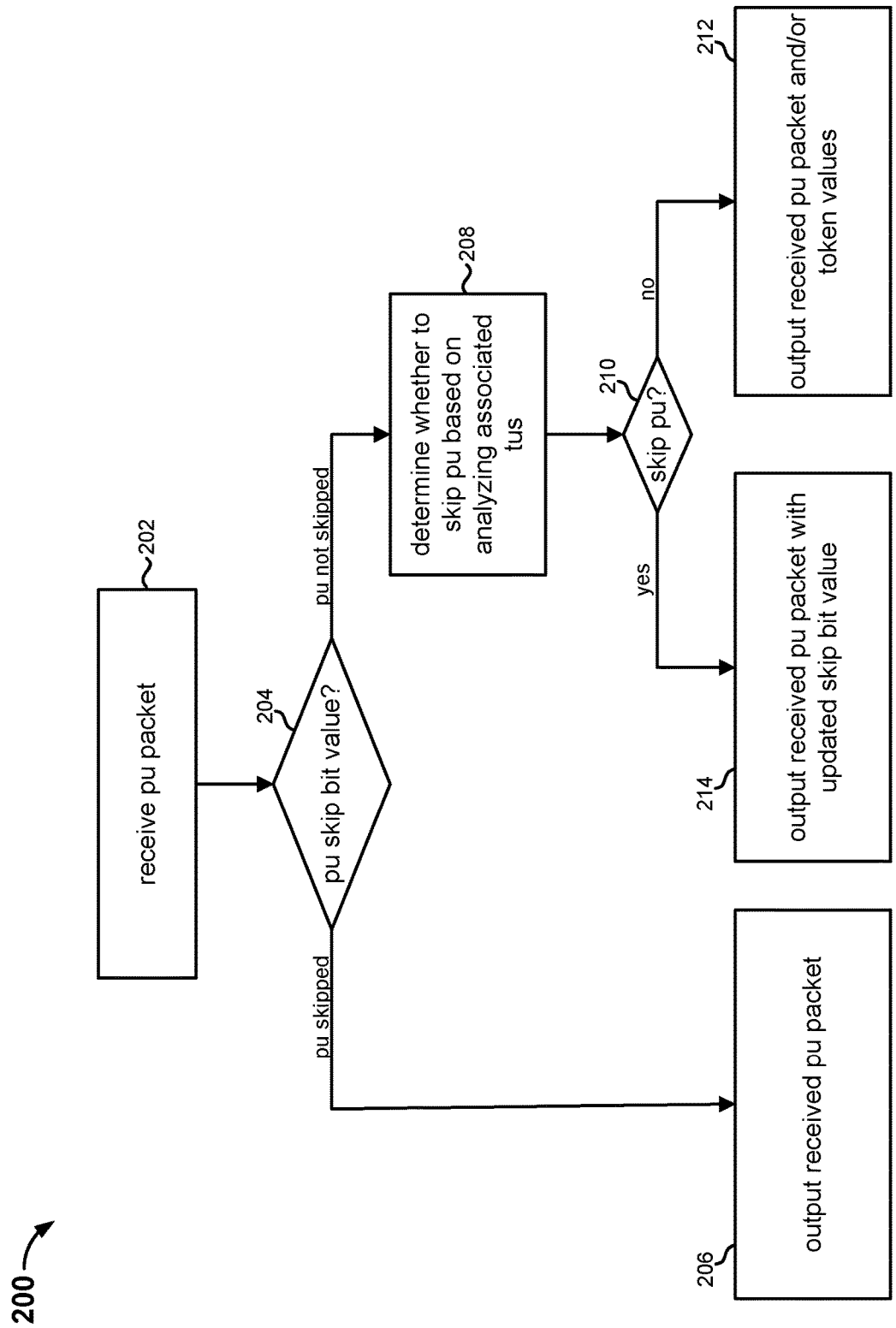
FIG. 2 is a high level flow chart illustrating an embodiment of a process for skip detection.

FIG. 2 is a high level flow chart illustrating an embodiment of a process for skip detection. In some embodiments, process 200 of FIG. 2 is employed by encoder module 100 of FIGS. 1A-1B for PU skip detection. Process 200 starts at step 202 at which a PU packet is received. The PU packet may be received at step 202, for example, from an upstream node or module of a previous encoding stage. The PU packet received at step 202 comprises PU control information, including a PU skip bit. At step 204, the PU skip bit value is checked. If it is determined at step 204 that a value of the PU skip bit indicates that the PU is skipped, the PU packet received at step 202 is output or provided without modification to a downstream node or module of a next encoding stage at step 206. If it is determined at step 204 that a value of the PU skip bit indicates that the PU is not skipped, it is determined at step 208 whether to skip the PU based on analyzing associated TUs. At step 210, the PU skip decision that is determined at step 208 is checked. If it is determined at step 210 that the PU is not skipped, the PU packet received at step 202 is output or provided without modification to a downstream node or module of a next encoding stage at step 212 and/or PU coefficient token values are output or provided at step 212. If it is determined at step 210 that the PU is skipped, the PU packet received at step 202 is output or provided with an updated skip bit value to a downstream node or module of a next encoding stage at step 214. The updated skip bit value indicates that the PU is skipped. Process 200 subsequently ends.

Figure 3:
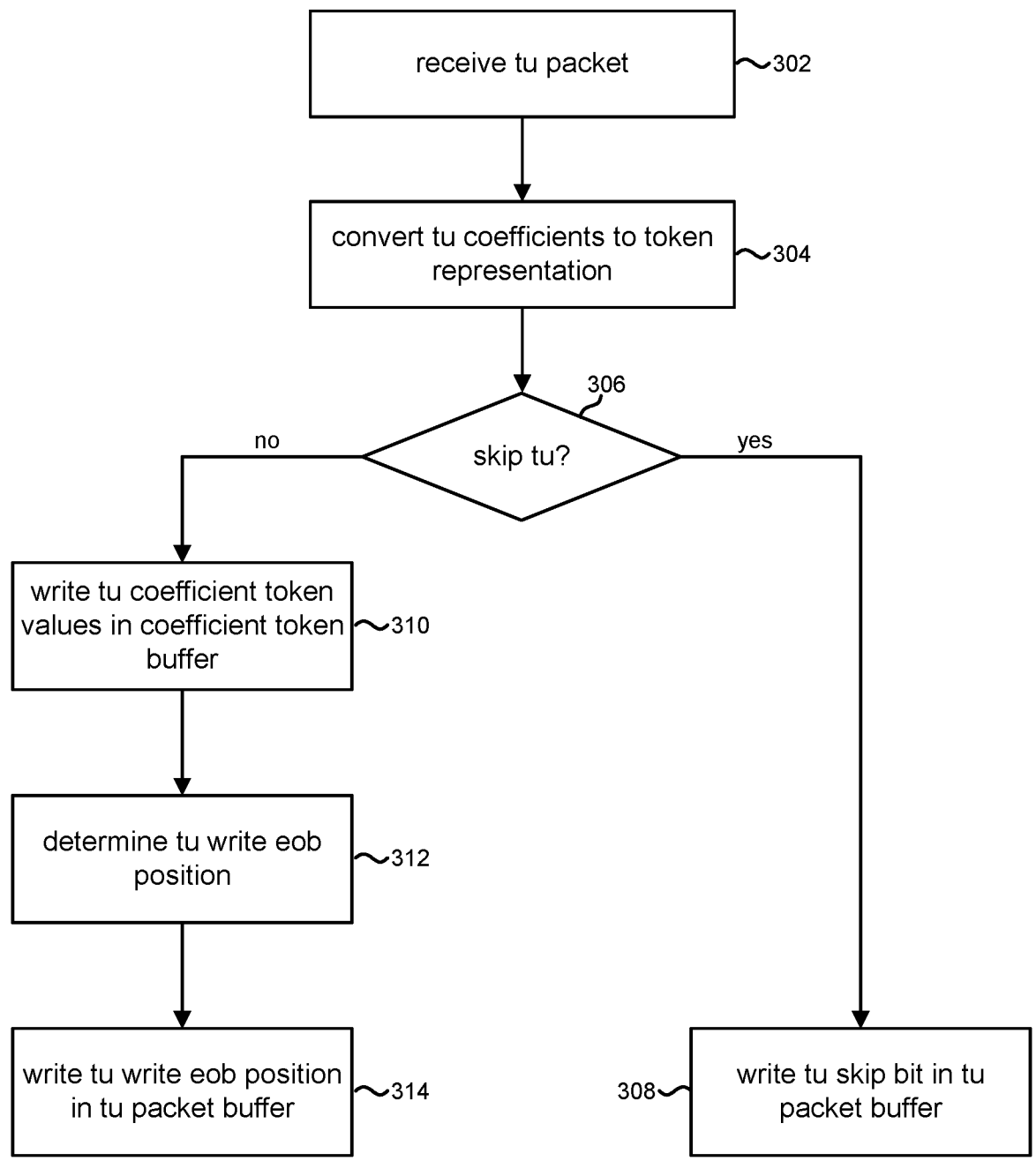
FIG. 3 is a high level flow chart illustrating an embodiment of a process for skip detection.

FIG. 3 is a high level flow chart illustrating an embodiment of a process for skip detection. In some embodiments, process 300 of FIG. 3 is employed by encoder module 100 of FIGS. 1A-1B for TU and PU skip detection. In some embodiments, process 300 of FIG. 3 comprises step 208 of process 200 of FIG. 2. Process 300 starts at step 302 at which a TU packet is received. The TU packet may be received at step 302, for example, from an upstream node or module of a previous encoding stage. The TU packet received at step 302 comprises coefficient values and/or corresponding coefficient index values. Coefficient values received at step 302 are converted into a more compact token representation at step 304. At step 306, it is determined whether to skip the TU, i.e., it is determined whether the TU comprises all zero coefficient token values. If it is determined at step 306 to skip the TU, a TU skip bit value that indicates a skipped TU is written or stored at step 308 in a small TU packet buffer that stores control information for a TU packet and that is different from a coefficient token buffer that stores TU coefficient token values. If it is determined at step 306 to not skip the TU, TU coefficient token values are written into or stored in a coefficient token buffer at step 310, e.g., at corresponding scan order positions. In some embodiments, the buffer of step 310 comprises an adaptive circular buffer in which TU coefficient token values are written or stored and/or from which TU coefficient token values are read, e.g., for future processing. At step 312, a TU write EOB position is determined. The TU write EOB position determined at step 312 may comprise an address value or an offset value from a base address. At step 314, the TU write EOB position is written or stored in the TU packet buffer of step 308. Process 300 subsequently ends. In some embodiments, process 300 is iterated for each TU comprising a current PU, and a current PU is determined to be skipped if all TUs of the current PU comprise skipped TUs.

Although the foregoing embodiments have been described in some detail for purposes of clarity of understanding, the disclosure is not limited to the details provided. There are many alternative ways of implementing the disclosure. The disclosed embodiments are illustrative and not restrictive.

What is claimed is:

1. A method, comprising:
receiving control information associated with a prediction unit of a video frame at a node of a video encoding pipeline used to compress the video frame, wherein the control information comprises a skip bit indicating a predicted skip decision that the prediction unit is not skipped;
making an actual skip decision for the prediction unit by analyzing transform units comprising the prediction unit, wherein the actual skip decision indicates whether the prediction unit is skipped during encoding; and
providing the actual skip decision for the prediction unit to a downstream node of the video encoding pipeline.

2. The method of claim 1, wherein making the actual skip decision comprises determining the prediction unit is skipped if all transform units comprise all zero coefficients and determining the prediction unit is not skipped if at least one transform unit comprises at least one non-zero coefficient.

3. The method of claim 1, wherein analyzing a transform unit comprises determining that all coefficients are zero and that the transform unit is skipped.

4. The method of claim 1, wherein analyzing a transform unit comprises determining that at least one coefficient is non-zero and that the transform unit is not skipped.

5. The method of claim 1, wherein analyzing a transform unit comprises converting coefficients into coefficient tokens.

6. The method of claim 1, wherein analyzing a transform unit comprises converting coefficients into coefficient tokens and writing coefficient tokens into a buffer in a prescribed scan order that has more tailing zeros than a raster order.

7. The method of claim 6, wherein tailing zeros written into the buffer are not persisted in the buffer.

8. The method of claim 1, further comprising updating the skip bit based on the actual skip decision.

9. A node of a video encoding pipeline used to compress a video frame, comprising:
 a buffer memory configured to store received control information associated with a prediction unit of the video frame, wherein the control information comprises a skip bit indicating a predicted skip decision that the prediction unit is not skipped; and
 a processor coupled to the buffer memory and configured to:
  make an actual skip decision for the prediction unit by analyzing transform units comprising the prediction unit, wherein the actual skip decision indicates whether the prediction unit is skipped during encoding; and
  provide the actual skip decision for the prediction unit to a downstream node of the video encoding pipeline.

10. The node of claim 9, wherein to make the actual skip decision comprises to determine the prediction unit is skipped if all transform units comprise all zero coefficients and to determine the prediction unit is not skipped if at least one transform unit comprises at least one non-zero coefficient.

11. The node of claim 9, wherein analyzing a transform unit comprises determining that all coefficients are zero and that the transform unit is skipped.

12. The node of claim 9, wherein analyzing a transform unit comprises determining that at least one coefficient is non-zero and that the transform unit is not skipped.

13. The node of claim 9, wherein analyzing a transform unit comprises converting coefficients into coefficient tokens and writing coefficient tokens into a buffer in a prescribed scan order that has more tailing zeros than a raster order.

14. The node of claim 9, wherein the processor is further configured to update the skip bit based on the actual skip decision.

15. A computer program product embodied in a non-transitory computer readable medium and comprising computer instructions for:
 receiving control information associated with a prediction unit of a video frame at a node of a video encoding pipeline used to compress the video frame, wherein the control information comprises a skip bit indicating a predicted skip decision that the prediction unit is not skipped;
 making an actual skip decision for the prediction unit by analyzing transform units comprising the prediction unit, wherein the actual skip decision indicates whether the prediction unit is skipped during encoding; and
 providing the actual skip decision for the prediction unit to a downstream node of the video encoding pipeline.

16. The computer program product of claim 15, wherein making the actual skip decision comprises determining the prediction unit is skipped if all transform units comprise all zero coefficients and determining the prediction unit is not skipped if at least one transform unit comprises at least one non-zero coefficient.

17. The computer program product of claim 15, wherein analyzing a transform unit comprises determining that all coefficients are zero and that the transform unit is skipped.

18. The computer program product of claim 15, wherein analyzing a transform unit comprises determining that at least one coefficient is non-zero and that the transform unit is not skipped.

19. The computer program product of claim 15, wherein analyzing a transform unit comprises converting coefficients into coefficient tokens and writing coefficient tokens into a buffer in a prescribed scan order that has more tailing zeros than a raster order.

20. The computer program product of claim 15, further comprising computer instructions for updating the skip bit based on the actual skip decision.

* * * * *